(No Model.)
G. W. KNAPP.
METHOD OF MAKING PLUMBERS' TRAPS.
No. 440,951. Patented Nov. 18, 1890.
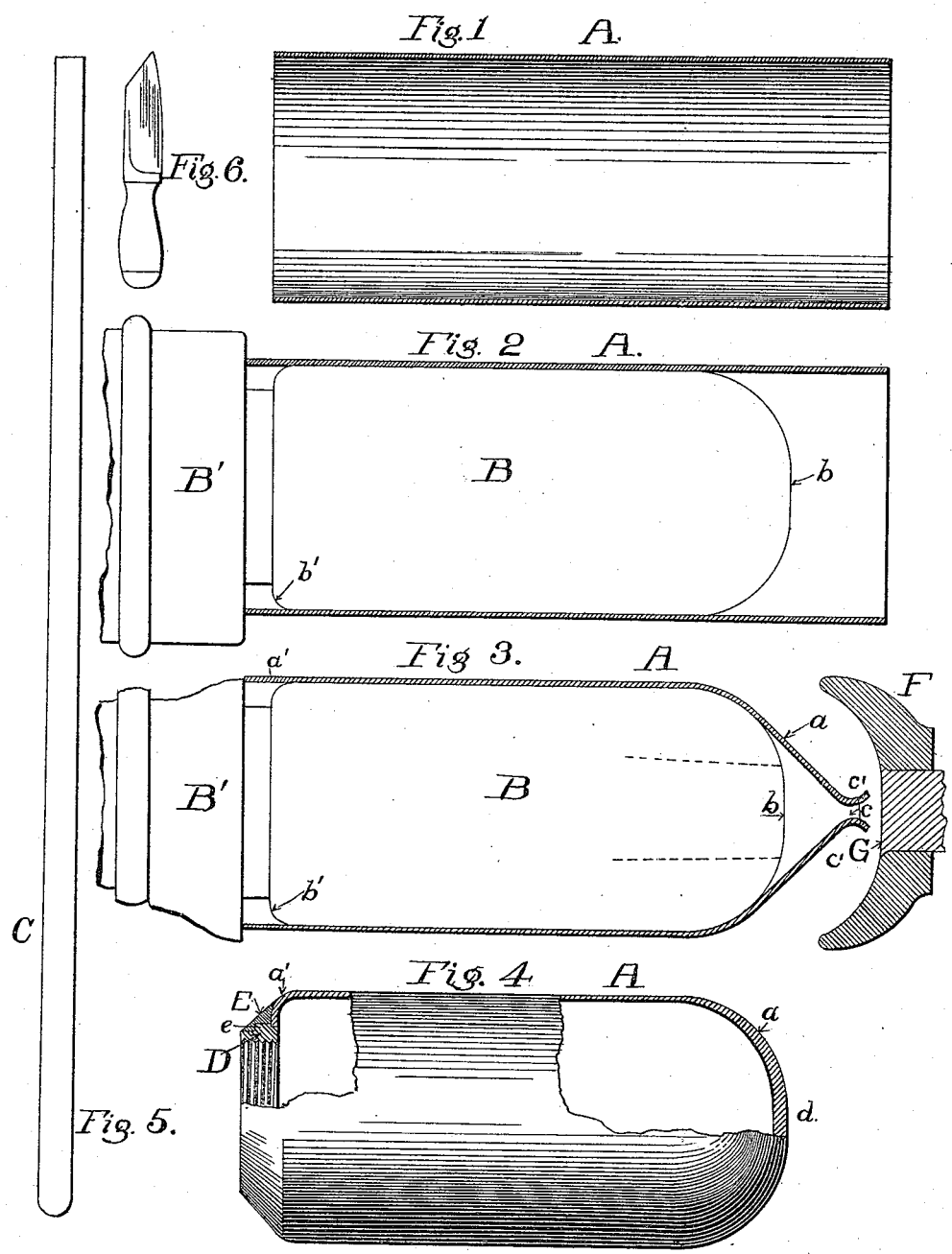
Witnesses
Chas. C. Dodge
Wm L. Boyden
Inventor
George W. Knapp
per Fred E. Tasker
Attorney

UNITED STATES PATENT OFFICE.

GEORGE W. KNAPP, OF WORCESTER, MASSACHUSETTS.

METHOD OF MAKING PLUMBERS' TRAPS.

SPECIFICATION forming part of Letters Patent No. 440,951, dated November 18, 1890.

Application filed April 4, 1890. Serial No. 346,522. (No model.)

*To all whom it may concern:*

Be it known that I, GEORGE W. KNAPP, a citizen of the United States, residing at Worcester, in the county of Worcester and State of Massachusetts, have invented certain new and useful Improvements in Sanitary Traps and Methods of Making Same; and I do hereby declare the following to be a full, clear, and exact description of the invention, such as will enable others skilled in the art to which it appertains to make and use the same.

My invention relates to an improvement in sewer, sanitary, or stench traps and in the method of making the same, the object being to provide a simple, easy, and efficient method of making traps whereby will be produced neatly-constructed sewer-traps, resembling the work which has heretofore been commonly done by hand in plumbers' shops, said traps having certain structural peculiarities—such as a thickening or re-enforcing at the bottom thereof—whereby additional strength is secured, and also the feature at the top end of the trap of having a brass or other screw-ring connected thereto by means of a wipe-joint perfectly tight and of good appearance; and to this end the invention consists in the improved sewer-trap to be hereinafter described, and also in the method of making the same, which will be hereinafter described and claimed.

In order to illustrate the manner of carrying my improved method of making sewer-traps into practical use, I have annexed hereunto a sheet of drawings, in which the operation of the method is depicted in its several steps, and also the resulting improved sewer-trap is shown, indicating its structural peculiarities and advantages.

In the drawings, Figure 1 is a sectional side elevation of a piece of common regularly-constructed lead pipe cut to the desired length for use in the manufacture of my improved sewer-trap. Fig. 2 is a similar view of the length of lead pipe after it has been placed upon a lathe-chuck for the purpose of converting it into the trap by my improved method. Fig. 3 is a side elevational view of the lead pipe located upon the chuck, showing also the movable head which is employed in conjunction with the chuck, and showing the pipe after it has been subjected partially to the operations involved in the carrying out of the method. Fig. 4 is a side elevation of the complete sanitary-trap, portions thereof being broken away to illustrate the thickened bottom end of the trap and its ring-provided upper end. Fig. 5 is a view of one form of tool that may be employed in my method. Fig. 6 is a view of another kind of tool which is employed in the performance of one of the steps of the method.

Similar letters of reference designate corresponding parts throughout all the different figures of the drawings.

In carrying my invention into practical effect I first take lead pipe of the common regularly-made kind and cut it with a saw or other instrument into sections of the desired length to form the sewer-traps.

A denotes a section of lead pipe cut to the proper length. This pipe, tube, or other hollow metal is next placed upon a suitable chuck, as B, which is fastened to the arbor of a lathe—as, for instance, B'. Any suitable and desirable chuck may be employed for the purpose of having mounted thereon the lead pipe out of which the sewer-trap is to be made. Hence the chuck B depicted in the drawings, is selected as one example of chuck. One end of this chuck has a suitably rounded, curved, or convexed end *b* of the proper character to impart a suitable curvature to the inner bottom end of the sewer-trap, the central portion of said end of the chuck being very hard and preferably of iron, so that great pressure may be brought to bear upon the bottom of the trap while it is forming between this end of the chuck and a movable outer head. The other end of the chuck B has a curved or rounded edge *b'*, which will serve to impart to the other end of the trap the proper shape to enable the screw-ring to be connected to said end of the trap. The lead pipe having thus been placed upon the lathe-chuck, and the latter having been set in motion so as to have a rapid revolution, the plumber or other operator can now begin the work of shaping the pipe A into the form of the trap. At the beginning of this work he preferably employs a spinning-tool consisting simply of a common wooden stick or rod C. (Shown in Fig.

5.) He will apply this stick to the outer surface of the end of the pipe A, which projects beyond the convexed end *b* of the chuck, and by pressing inwardly upon the pipe end will compress it more or less, causing it to be bent, so that the sides of the pipe are convergent and the periphery of its end diminished. The operator, however, will use the wooden spinning-tool only for a short time, and will then dispense with it and substitute in lieu thereof some suitable iron or metallic spinning-tool, similar in shape, perhaps, to the wooden one, with which he will continue to operate upon the bottom end of the pipe as before, still further compressing the sides of the pipe until they are brought very close together, the opening in the end of the pipe, as at *c*, being very much reduced in size, so that the end of the pipe is practically closed, and the edge of this end of the pipe having something of the form shown in Fig. 3, where it is seen to consist of a curved lip forming a sort of a conical projection. This is the natural form that the pipe end will assume when the spinning operation has been conducted to this point. The sides will be pressed, as shown, over the end of the chuck and brought together at a narrow neck, between which and the peripheral edge is a sort of flaring mouth or "conical lip," as I have termed it. The operator will now lay aside his spinning-tool for a moment and take up some such tool as that indicated in Fig. 6, which has a V-shaped end, which he will insert into the conical lip or flaring mouth on the end of the pipe and hold it there for a moment, the result of which will be to polish or brighten the interior surface of this conical lip. He will then lay aside the tool shown in Fig. 6 and again resume operations with the spinning-tool, applying it first to the conical lip, infolding its edges *c'*. As the interior surface of this lip or flaring mouth has been highly polished or brightened by the action of the tool, it will be clear that when the infolding and compacting of the sides take place the force of adhesion will operate to bind these smoothly-polished surfaces closely together, just in the same way that two leaden bullets when cut, with their faces placed together, are firmly united through adhesive force. The operator continues to apply his tool to the central portion of the end of the pipe, compressing it by degrees until it has been compacted still further.

Adjoining the outer end of the chuck B, and constituting a portion of the machine which I preferably employ in carrying my invention into practical effect, and by means of which I secure pressure during the steps of the process, is a movable head F, of a cup shape or concaved shape, said head being mounted upon a spindle G, the end of which constitutes the central portion of the concaved head, and is of a hard iron or other metallic surface, said surface being located directly opposite to the hard central surface of the chuck, the forming bottom of the trap being between these two hard surfaces. At this step in the operation, therefore, this concaved or cup-shaped head is forced by a suitable means against the end of the pipe, the result of which will be to press the same toward the end of the chuck. One movement of the head at this time will probably be sufficient, and the head will then return to its normal position. This movement of the head is accomplished by certain leverage or other devices not shown in the drawings. The operator will then resume operations with his spinning-tool and will operate upon the end of the pipe, nicely rounding and compacting and shaping the same, so that finally it has substantially the thickened appearance shown at *d* in Fig. 4, where the bottom of the trap is completed. There is, however, one other finishing step which is of importance in my process. This consists in again forcing, under very great power, the movable head F against the bottom of the trap, so that the central portion of this bottom may be subjected to an enormous pressure between the two hard iron surfaces before alluded to. In this way, as a result of the great pressure brought to bear upon the bottom of the trap, a thickened embossment, strong and durable and having no tendency to weaken in any way, is made and a very serviceable and valuable article in the way of a sewer-trap produced.

It will thus be seen that in the performance of my process no heat whatever is applied to the end of the pipe in order to form a complete homogeneous seamless bottom. The lead is neither fused nor melted in any way; but the bottom is produced as the result of pressure applied thereto while the lead is in a cold state, and the result is that a bottom is produced of great strength and durability.

The melting of lead or the subjecting of it to heat, causing it to flow or fuse, does, of course, weaken the metal, making it liable to crack, since it becomes brittle upon cooling, and therefore the bottom of a trap made in this way is not strong, but is weak and liable to break at any time; but where the bottom is made completely and wholly as a result of cold pressure no such brittle characteristic is found in the resulting trap; but the thickened embossment on the bottom, especially at the central portion thereof, makes a trap-bottom capable of withstanding a hydraulic pressure of seventy pounds or more. The process, therefore, of re-enforcing and strengthening the trap-bottom in the way that I have described as the result of pressure upon the cold metal is found to be highly superior to every process where the metal is melted or fused.

D denotes an internally-screw-threaded ring, of brass or other suitable metal, which is adapted to be inserted into the top end of the sewer-trap. After the thickened bottom of the trap has been completed the plumber or other operator will, by applying his tool to the other end of the pipe A, compress the same over the rounded edge b' of the chuck, so as to form the inturned pipe-edge a', as shown in Fig. 4. The screw-ring D has an internal rabbet or shoulder e, adapted to receive the inturned end a' of the pipe. Thus the ring D is firmly connected to the pipe by the soldering E, which makes a tight, impermeable secure wipe-joint.

In the carrying out of the steps of my process the chuck employed will of course be so constructed that it may be easily withdrawn from the sewer-trap after the spinning operation upon the end portions thereof has been completed.

Having thus described my invention, what I claim as new, and desire to secure by Letters Patent, is—

1. The herein-described method of making traps for sanitary or other uses, which consists in mounting a pipe upon a revolving chuck, then spinning down one end of the pipe by means of a suitable tool, so as to close said end without fusing or applying heat to the metal, and finally subjecting the closed end to great pressure, so as to form a re-enforced bottom for the trap.

2. The herein-described method of making traps for sanitary or other uses, which consists in mounting the pipe upon a revolving chuck, spinning down the projecting end of the pipe so as to substantially close said end, leaving a flaring mouth or lip, polishing the interior surface of said mouth or lip, continuing the spinning operation, and finally subjecting the closed end of the pipe to great pressure to complete the formation of the trap-bottom without fusing or heating the metal.

3. The herein-described method of making traps for sanitary or other uses, which consists in placing the pipe on a revolving object, spinning down the end thereof to a narrow neck, leaving a flaring mouth, polishing the interior surface of this mouth, subjecting the bottom to pressure so as to collapse it around the end of the chuck, continuing the spinning operation upon the closed end of the pipe, and finally subjecting it to great pressure, so that a complete homogeneous re-enforced bottom may be formed, the metal being kept cool all the while and not heated or fused.

4. The method of making traps for sanitary or other uses, which consists in placing the pipe upon a revolving chuck or similar device, spinning down the projecting end thereof, and subjecting the end thus closed by spinning to very great pressure in order to form a thickened re-enforced bottom for the trap, said bottom being made entirely through the application of pressure to the metal and without heating or fusing the same in any degree, substantially as described.

5. The method of making traps for sanitary or other purposes, which consists in mounting the pipe upon a revolving chuck, spinning down one end of said pipe by means of a suitable tool, then subjecting said end to pressure so as to complete the formation of the strong re-enforced bottom without the application of heat to the metal, then spinning down the other end of the pipe to form an inturned edge adapted to have a screw-ring connected thereto by a wipe-joint, substantially as described.

6. The herein-described sewer-trap, having the complete homogeneous seamless re-enforced bottom end formed entirely by cold pressure.

7. The herein-described sewer-trap, having the thickened bottom and the inturned upper edge connected to a screw-ring by a wipe-joint, substantially as described.

In testimony whereof I affix my signature in presence of two witnesses.

GEORGE W. KNAPP.

Witnesses:
RUFUS B. DODGE, Jr.,
ADA S. WHITNEY.